United States Patent
Nair et al.

(10) Patent No.: US 8,822,628 B2
(45) Date of Patent: Sep. 2, 2014

(54) CROSSLINKABLE LIQUID CRYSTALLINE POLYMER

(71) Applicant: Ticona LLC, Florence, KY (US)

(72) Inventors: Kamlesh P. Nair, Florence, KY (US); Young Shin Kim, Erlanger, KY (US)

(73) Assignee: Ticona LLC, Florence, KY (US)

( * ) Notice: Subject to any disclaimer, the term of this patent is extended or adjusted under 35 U.S.C. 154(b) by 0 days.

(21) Appl. No.: 14/028,567

(22) Filed: Sep. 17, 2013

(65) Prior Publication Data
US 2014/0088285 A1    Mar. 27, 2014

Related U.S. Application Data

(60) Provisional application No. 61/704,690, filed on Sep. 24, 2012.

(51) Int. Cl.
*C08G 63/02* (2006.01)
*C08G 63/18* (2006.01)

(52) U.S. Cl.
USPC ................ 528/192; 528/201; 528/205

(58) Field of Classification Search
USPC ........................... 528/192, 201, 205
See application file for complete search history.

(56) References Cited

U.S. PATENT DOCUMENTS

| | | |
|---|---|---|
| 3,975,444 A | 8/1976 | Kovar et al. |
| 4,161,470 A | 7/1979 | Calundann |
| 4,513,131 A | 4/1985 | Reinhardt et al. |
| 4,567,240 A | 1/1986 | Hergenrother et al. |
| 4,626,584 A | 12/1986 | Stackman et al. |
| 4,628,125 A | 12/1986 | Rogers et al. |
| 4,654,412 A | 3/1987 | Calundann et al. |
| 4,710,547 A | 12/1987 | Uryu et al. |
| 4,739,030 A | 4/1988 | Lubowitz et al. |
| 4,814,516 A | 3/1989 | Takeuchi et al. |
| 4,851,495 A | 7/1989 | Sheppard et al. |
| 4,961,874 A | 10/1990 | Takeuchi et al. |
| 5,068,053 A | 11/1991 | Reiffenrath et al. |
| 5,082,919 A | 1/1992 | Sacripante et al. |
| 5,096,987 A | 3/1992 | Pigneri |
| 5,114,612 A | 5/1992 | Benicewicz et al. |
| 5,115,087 A | 5/1992 | Sheppard et al. |
| 5,216,073 A | 6/1993 | Haider et al. |
| 5,216,096 A | 6/1993 | Hattori et al. |
| 5,235,025 A | 8/1993 | Casagrande et al. |
| 5,314,640 A | 5/1994 | Yamada |
| 5,370,819 A | 12/1994 | Fujita et al. |
| 5,374,701 A | 12/1994 | Hay et al. |
| 5,453,864 A | 9/1995 | Yamada et al. |
| 5,475,133 A | 12/1995 | Douglas et al. |
| 5,506,060 A | 4/1996 | Lubowitz et al. |
| 5,521,014 A | 5/1996 | Lubowitz et al. |
| 5,550,204 A | 8/1996 | Lubowitz et al. |
| 5,575,949 A | 11/1996 | Benicewicz et al. |
| 5,595,682 A | 1/1997 | Goodby et al. |
| 5,616,680 A | 4/1997 | Linstid, III |
| 5,700,393 A | 12/1997 | Kelly |
| 5,769,393 A | 6/1998 | Kobayashi et al. |
| 5,770,107 A | 6/1998 | Hassall et al. |
| 5,846,451 A | 12/1998 | Nakano et al. |
| 6,114,492 A | 9/2000 | Linstid, III et al. |
| 6,121,495 A | 9/2000 | Babb et al. |
| 6,149,837 A | 11/2000 | Sekine et al. |
| 6,171,518 B1 | 1/2001 | Hikmet et al. |
| 6,344,154 B1 | 2/2002 | Coates et al. |
| 6,350,817 B1 | 2/2002 | Connell et al. |
| 6,441,099 B1 | 8/2002 | Connell et al. |
| 6,514,611 B1 | 2/2003 | Shepherd et al. |
| 6,583,255 B1 | 6/2003 | Lubowitz et al. |
| 6,623,810 B2 | 9/2003 | Sekine et al. |
| 6,673,267 B2 | 1/2004 | Sekine et al. |
| 6,849,202 B2 | 2/2005 | Sekine et al. |
| 6,939,940 B2 | 9/2005 | Dingemans et al. |
| 7,070,712 B2 | 7/2006 | Tang et al. |
| 7,094,359 B2 | 8/2006 | Okamoto et al. |
| 7,507,784 B2 | 3/2009 | Dingemans et al. |
| 7,655,155 B2 | 2/2010 | Jung et al. |
| 7,910,020 B2 | 3/2011 | He et al. |
| 7,943,722 B2 | 5/2011 | Kim |
| 7,943,856 B2 | 5/2011 | Yang et al. |
| 8,039,576 B2 * | 10/2011 | Laskoski et al. ............... 528/205 |

(Continued)

FOREIGN PATENT DOCUMENTS

| | | |
|---|---|---|
| CA | 1 263 990 A | 12/1989 |
| EP | 0 890 595 B1 | 2/2000 |

(Continued)

OTHER PUBLICATIONS

Abstract of French Patent—FR2612182, Sep. 16, 1988, 1 page.
Abstract of Japanese Patent—JPS63284147, Nov. 21, 1988, 2 pages.
Abstract of Japanese Patent—JPH01234414, Sep. 19, 1989, 2 pages.
Abstract of Japanese Patent—JPH01308486, Dec. 13, 1989, 2 pages.
Abstract of Japanese Patent—JPH07258637, Oct. 9, 1995, 2 pages.
Abstract of Japanese Patent—JPH10101608, Apr. 21, 1998, 1 page.
Abstract of Japanese Patent—JP2001302592, Oct. 31, 2001, 2 pages.
Abstract of Japanese Patent—JP2008222690, Sep. 25, 2008, 1 page.
Abstract of Korean Patent—KR20110078894, Jul. 7, 2011, 1 page.

(Continued)

*Primary Examiner* — Terressa Boykin
(74) *Attorney, Agent, or Firm* — Dority & Manning, P.A.

(57) ABSTRACT

A crosslinkable liquid crystalline polymer that is formed by polymerizing a precursor monomer in the presence of an aromatic crosslinking agent is provided. The crosslinking agent has the following general formula (I):

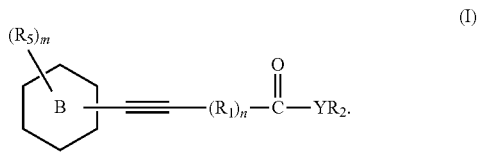

28 Claims, 2 Drawing Sheets

(56) References Cited

U.S. PATENT DOCUMENTS

| | | |
|---|---|---|
| 8,101,248 B2 | 1/2012 | Yun et al. |
| 8,105,663 B2 | 1/2012 | Lee et al. |
| 8,178,646 B2 | 5/2012 | Kohinata et al. |
| 8,440,313 B2 | 5/2013 | Cho et al. |
| 8,440,914 B2 | 5/2013 | Lee et al. |
| 8,492,507 B2 | 7/2013 | Rosenberg et al. |
| 8,552,123 B2 | 10/2013 | Lee et al. |
| 2006/0252906 A1 | 11/2006 | Godschalz et al. |
| 2010/0124037 A1 | 5/2010 | Jung et al. |
| 2010/0155120 A1 | 6/2010 | Lee et al. |
| 2010/0159231 A1 | 6/2010 | Cho et al. |
| 2011/0235292 A1 | 9/2011 | Jung et al. |
| 2014/0088247 A1 | 3/2014 | Nair |
| 2014/0088284 A1 | 3/2014 | Nair |

FOREIGN PATENT DOCUMENTS

| | | |
|---|---|---|
| EP | 1 320 567 B1 | 12/2008 |
| EP | 2 202 221 A1 | 6/2010 |
| WO | WO 0222706 A1 | 3/2002 |
| WO | WO 2004058851 A1 | 7/2004 |
| WO | WO 2010030216 A1 | 3/2010 |

OTHER PUBLICATIONS

Abstract of Korean Patent—KR20110082883, Jul. 20, 2011, 1 page.
Abstract of WO Patent—WO99/24529, May 20, 1999, 1 page.
Paper—Dingemans et al., "Liquid Crystal Thermosets, A New Generation of High Performance Liquid Crystal Polymers," NASA Langley Research Center, Virginia, Apr. 18, 2007, 4 pages.
Paper—Haight et al., "Liquid Crystalline Thermosets for High Temperature Adhesive Applications," Proc. $50^{th}$ Intl. SAMPE Symp. and Exhib., Long Beach, California, May 1-5, 2005, 16 pages.

* cited by examiner

CROSSLINKABLE LIQUID CRYSTALLINE POLYMER

RELATED APPLICATIONS

The present application claims priority to U.S. Provisional Application Ser. No. 61/704,690, filed on Sep. 24, 2012, which is incorporated by reference herein in its entirety.

BACKGROUND OF THE INVENTION

Thermotropic liquid crystalline polymers are classified as "rigid rod" polymers as their molecular structure is typically composed of aromatic units linked by ester groups, as well as other groups (e.g., amide groups). The rigid, rod-like structure allows the polymers to exhibit liquid crystalline behavior in their molten state (thermotropic nematic state). Due to the presence of this nematic state in the melt, these materials also exhibit unique rheological properties. One such property is a "shear thinning behavior" characterized by a decrease in complex viscosity with increasing shear rates. This high shear thinning behavior is particularly attractive in the fabrication of parts with intricate geometries (e.g., electrical connectors) because the polymers can flow well under heat and shear to uniformly fill complex parts at fast rates without excessive flashing or other detrimental processing issues. Despite these benefits, the aforementioned polymers still have various drawbacks. For example, the heat resistance of the polymer is often relatively poor as compared to other engineering thermoset materials, as evidenced by a relatively lower deflection temperature under load ("DTUL"). This can lead to inadequate mechanical properties at elevated temperatures, which is particularly problematic as the demand for heat resistance at high temperatures continually increases in molding, fiber, and film applications.

To improve heat resistance and other properties, various attempts have been made to thermally crosslink the polymer while still maintaining its liquid crystal order. In one such process, for example, a thermoset LCP polymer is produced using 4-phenylethynyl phthalic anhydride ("4-PEPA"). While this approach has some advantages, 4-PEPA is a relatively expensive crosslinking agent. Also, the incorporation of the 4-PEPA in LCP as endcaps requires a multi-step process. In the $1^{st}$ step, either monofunctional phenolic or monofunctional carboxylic acid derivatives of 4-PEPA must initially be synthesized. These monofunctional derivatives are then reacted with LCP monomers to form a low molecular weight oligomer that is functionalized by 4-PEPA end groups. In the final step, the oligomers are heated at temperatures typically ranging from 350° C. to 400° C. to induce thermal crosslinking. While the resulting thermoset resin can exhibit some improved properties, problems nevertheless remain. For instance, the oligomer that is achieved in the $2^{nd}$ step of the reaction generally has a low melt viscosity and melting temperature, which can adversely impact the thermal and mechanical properties of the resulting polymer and restrict the manner in which it may be processed prior to crosslinking. Further, the use of a multi-step reaction to form the thermoset polymer can also be costly and overly complex.

As such, a need exists for an improved technique for forming thermoset liquid crystalline polymers.

SUMMARY OF THE INVENTION

In accordance with one embodiment of the present invention, a crosslinkable liquid crystalline polymer is disclosed that is formed by polymerizing a precursor monomer in the presence of an aromatic alkynyl crosslinking agent having the following general formula (I):

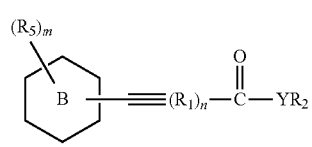

wherein,
ring B is a 6-membered aromatic ring wherein 1 to 3 ring carbon atoms are optionally replaced by nitrogen or oxygen, wherein each nitrogen is optionally oxidized, and wherein ring B may be optionally fused or linked to a 5- or 6-membered aryl, heteroaryl, cycloalkyl, or heterocyclyl;
$R_5$ is alkynyl, alkyl, alkenyl, aryl, heteroaryl, cycloalkyl, heterocyclyl, halo, or haloalkyl;
m is from 0 to 4;
n is from 0 to 6;
Y is O, S, or $NR_3$;
$R_1$ is alkyl or alkenyl;
$R_2$ is hydrogen, alkyl, aryl, heteroaryl, cycloalkyl, or heterocyclyl; and
$R_3$ is hydrogen, alkyl, aryl, heteroaryl, cycloalkyl, or heterocyclyl.

In accordance with another embodiment of the present invention, a method for forming a liquid crystalline polymer is disclosed. The method melt polymerizing a reaction mixture comprising a precursor monomer and an aromatic alkynyl crosslinking agent, such as described herein.

Other features and aspects of the present invention are set forth in greater detail below.

BRIEF DESCRIPTION OF THE FIGURES

A full and enabling disclosure of the present invention, including the best mode thereof to one skilled in the art, is set forth more particularly in the remainder of the specification, including reference to the accompanying figures, in which.

DETAILED DESCRIPTION

Figure 1:
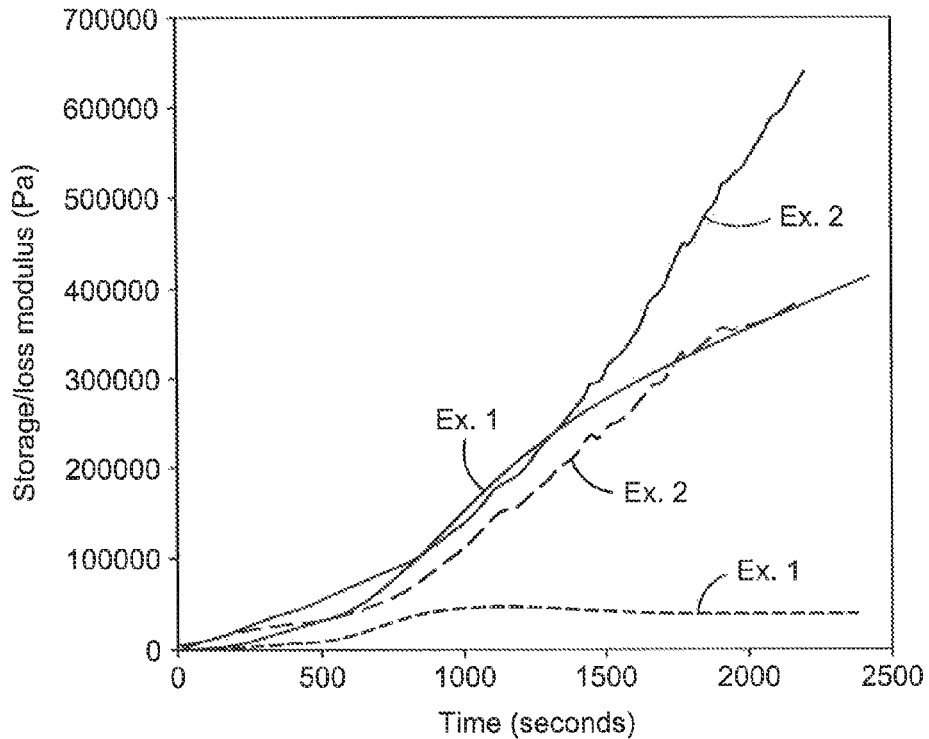
FIG. 1 is a graph showing the storage and loss modulii at 400° C. due to thermal crosslinking, where the solid lines represent the storage modulus and the broken lines represent the loss modulus.

It is to be understood that the terminology used herein is for the purpose of describing particular embodiments only and is not intended to limit the scope of the present invention.

"Alkyl" refers to monovalent saturated aliphatic hydrocarbyl groups having from 1 to 10 carbon atoms and, in some embodiments, from 1 to 6 carbon atoms. "$C_{x-y}$alkyl" refers to alkyl groups having from x to y carbon atoms. This term includes, by way of example, linear and branched hydrocarbyl groups such as methyl ($CH_3$), ethyl ($CH_3CH_2$), n-propyl ($CH_3CH_2CH_2$), isopropyl (($CH_3)_2CH$), n-butyl ($CH_3CH_2CH2CH_2$), isobutyl (($CH_3)_2CHCH_2$), sec-butyl (($CH_3)(CH_3CH_2)CH$), t-butyl (($CH_3)_3C$), n-pentyl ($CH_3CH_2CH_2CH_2CH_2$), and neopentyl (($CH_3)_3CCH_2$).

"Alkenyl" refers to a linear or branched hydrocarbyl group having from 2 to 10 carbon atoms and in some embodiments from 2 to 6 carbon atoms or 2 to 4 carbon atoms and having at least 1 site of vinyl unsaturation (>C=C<). For example, ($C_x$-$C_y$)alkenyl refers to alkenyl groups having from x to y carbon atoms and is meant to include for example, ethenyl, propenyl, 1,3-butadienyl, and so forth.

"Alkynyl" refers to refers to a linear or branched monovalent hydrocarbon radical containing at least one triple bond. The term "alkynyl" may also include those hydrocarbyl groups having other types of bonds, such as a double bond and a triple bond.

"Aryl" refers to an aromatic group of from 3 to 14 carbon atoms and no ring heteroatoms and having a single ring (e.g., phenyl) or multiple condensed (fused) rings (e.g., naphthyl or anthryl). For multiple ring systems, including fused, bridged, and spiro ring systems having aromatic and non-aromatic rings that have no ring heteroatoms, the term "Aryl" applies when the point of attachment is at an aromatic carbon atom (e.g., 5,6,7,8 tetrahydronaphthalene-2-yl is an aryl group as its point of attachment is at the 2-position of the aromatic phenyl ring).

"Cycloalkyl" refers to a saturated or partially saturated cyclic group of from 3 to 14 carbon atoms and no ring heteroatoms and having a single ring or multiple rings including fused, bridged, and spiro ring systems. For multiple ring systems having aromatic and non-aromatic rings that have no ring heteroatoms, the term "cycloalkyl" applies when the point of attachment is at a non-aromatic carbon atom (e.g., 5,6,7,8,-tetrahydronaphthalene-5-yl). The term "cycloalkyl" includes cycloalkenyl groups, such as adamantyl, cyclopropyl, cyclobutyl, cyclopentyl, cyclooctyl, and cyclohexenyl. The term "cycloalkenyl" is sometimes employed to refer to a partially saturated cycloalkyl ring having at least one site of >C=C< ring unsaturation.

"Halo" or "halogen" refers to fluoro, chloro, bromo, and iodo.

"Haloalkyl" refers to substitution of alkyl groups with 1 to 5 or in some embodiments 1 to 3 halo groups.

"Heteroaryl" refers to an aromatic group of from 1 to 14 carbon atoms and 1 to 6 heteroatoms selected from oxygen, nitrogen, and sulfur and includes single ring (e.g., imidazolyl) and multiple ring systems (e.g., benzimidazol-2-yl and benzimidazol-6-yl). For multiple ring systems, including fused, bridged, and spiro ring systems having aromatic and non-aromatic rings, the term "heteroaryl" applies if there is at least one ring heteroatom and the point of attachment is at an atom of an aromatic ring (e.g., 1,2,3,4-tetrahydroquinolin-6-yl and 5,6,7,8-tetrahydroquinolin-3-yl). In some embodiments, the nitrogen and/or the sulfur ring atom(s) of the heteroaryl group are optionally oxidized to provide for the N oxide (N→O), sulfinyl, or sulfonyl moieties. Examples of heteroaryl groups include, but are not limited to, pyridyl, furanyl, thienyl, thiazolyl, isothiazolyl, triazolyl, imidazolyl, imidazolinyl, isoxazolyl, pyrrolyl, pyrazolyl, pyridazinyl, pyrimidinyl, purinyl, phthalazyl, naphthylpyridyl, benzofuranyl, tetrahydrobenzofuranyl, isobenzofuranyl, benzothiazolyl, benzoisothiazolyl, benzotriazolyl, indolyl, isoindolyl, indolizinyl, dihydroindolyl, indazolyl, indolinyl, benzoxazolyl, quinolyl, isoquinolyl, quinolizyl, quianazolyl, quinoxalyl, tetrahydroquinolinyl, isoquinolyl, quinazolinonyl, benzimidazolyl, benzisoxazolyl, benzothienyl, benzopyridazinyl, pteridinyl, carbazolyl, carbolinyl, phenanthridinyl, acridinyl, phenanthrolinyl, phenazinyl, phenoxazinyl, phenothiazinyl, and phthalimidyl.

"Heterocyclic" or "heterocycle" or "heterocycloalkyl" or "heterocyclyl" refers to a saturated or partially saturated cyclic group having from 1 to 14 carbon atoms and from 1 to 6 heteroatoms selected from nitrogen, sulfur, or oxygen and includes single ring and multiple ring systems including fused, bridged, and spiro ring systems. For multiple ring systems having aromatic and/or non-aromatic rings, the terms "heterocyclic", "heterocycle", "heterocycloalkyl", or "heterocyclyl" apply when there is at least one ring heteroatom and the point of attachment is at an atom of a non-aromatic ring (e.g., decahydroquinolin-6-yl). In some embodiments, the nitrogen and/or sulfur atom(s) of the heterocyclic group are optionally oxidized to provide for the N oxide, sulfinyl, sulfonyl moieties. Examples of heterocyclyl groups include, but are not limited to, azetidinyl, tetrahydropyranyl, piperidinyl, N-methylpiperidin-3-yl, piperazinyl, N-methylpyrrolidin-3-yl, 3-pyrrolidinyl, 2-pyrrolidon-1-yl, morpholinyl, thiomorpholinyl, imidazolidinyl, and pyrrolidinyl.

It should be understood that the aforementioned groups encompass unsubstituted groups, as well as groups substituted with one or more other functional groups as is known in the art. For example, an alkynyl, alkyl, alkenyl, aryl, heteroaryl, cycloalkyl, or heterocyclyl group may be substituted with from 1 to 8, in some embodiments from 1 to 5, in some embodiments from 1 to 3, and in some embodiments, from 1 to 2 substituents selected from alkyl, alkenyl, alkynyl, alkoxy, acyl, acylamino, acyloxy, amino, quaternary amino, amide, imino, amidino, aminocarbonylamino, amidinocarbonylamino, aminothiocarbonyl, aminocarbonylamino, aminothiocarbonylamino, aminocarbonyloxy, aminosulfonyl, aminosulfonyloxy, aminosulfonylamino, aryl, aryloxy, arylthio, azido, carboxyl, carboxyl ester, (carboxyl ester) amino, (carboxyl ester)oxy, cyano, cycloalkyl, cycloalkyloxy, cycloalkylthio, guanidino, halo, haloalkyl, haloalkoxy, hydroxy, hydroxyamino, alkoxyamino, hydrazino, heteroaryl, heteroaryloxy, heteroarylthio, heterocyclyl, heterocyclyloxy, heterocyclylthio, nitro, oxo, thione, phosphate, phosphonate, phosphinate, phosphonamidate, phosphorodiamidate, phosphoramidate monoester, cyclic phosphoramidate, cyclic phosphorodiamidate, phosphoramidate diester, sulfate, sulfonate, sulfonyl, substituted sulfonyl, sulfonyloxy, thioacyl, thiocyanate, thiol, alkylthio, etc., as well as combinations of such substituents.

DETAILED DESCRIPTION

It is to be understood by one of ordinary skill in the art that the present discussion is a description of exemplary embodiments only, and is not intended as limiting the broader aspects of the present invention.

Generally speaking, the present invention is directed to a crosslinkable liquid crystalline polymer that is formed by polymerizing a precursor monomer in the presence of an aromatic alkynyl crosslinking agent. By selectively controlling the particular type and concentration of the aromatic alkynyl crosslinking agent and reaction conditions, the present inventor has discovered that a crosslinkable liquid crystalline polymer can be achieved that has a relatively high melting temperature. For example, the melting temperature of the crosslinkable polymer may be from about 280° C. to about 350° C., in some embodiments from about 290° C. to about 335° C., and in some embodiments, from about 300° C. to about 330° C. While having a relatively high melting temperature, the crosslinkable polymer can maintain a relatively low melt viscosity. The melt viscosity of the crosslinkable polymer may, for instance, be about 150 Pa-s or less, in some embodiments about 130 Pa-s or less, in some embodiments from about 1 to about 120 Pa-s, and in some embodiments, from about 2 to about 50 Pa-s, determined at a shear rate of 1000 seconds$^{-1}$. Melt viscosity may be determined in accordance with ASTM Test No. 1238-70 at temperatures ranging from 300° C. to 360° C. depending on the melting temperature (e.g., 300° C. or 360° C.).

The precursor monomers employed during the formation of the crosslinkable liquid crystalline polymer may generally vary as is known in the art. For example, suitable liquid crystalline polymers may include instance, aromatic polyesters, aromatic poly(esteramides), aromatic poly(estercarbonates), aromatic polyamides, etc., and may likewise contain monomer repeating units derived from one or more aromatic hydroxycarboxylic acids, aromatic dicarboxylic acids, aromatic diols, aromatic aminocarboxylic acids, aromatic amines, aromatic diamines, etc., as well as combinations thereof.

In one embodiment, for example, an aromatic polyester may be formed that contains aromatic hydroxycarboxylic repeating units of Formula (III) in an amount of from about 25 mol. % to about 85 mol. %, in some embodiments from about 40 mol. % to about 80 mol. %, and in some embodiments, from about 50 mol. % to about 75 mol. %:

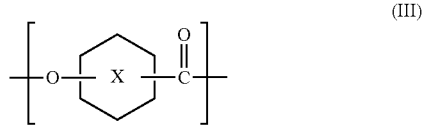

(III)

wherein, ring A is aryl (e.g., 1,4-phenylene or 1,3-phenylene).

The aromatic hydroxycarboxylic repeating units of Formula (III) may be derived from aromatic hydroxycarboxylic acids, such as, 4-hydroxybenzoic acid; 4-hydroxy-4'-biphenylcarboxylic acid; 2-hydroxy-6-naphthoic acid; 2-hydroxy-5-naphthoic acid; 3-hydroxy-2-naphthoic acid; 2-hydroxy-3-naphthoic acid; 4'-hydroxyphenyl-4-benzoic acid; 3'-hydroxyphenyl-4-benzoic acid; 4'-hydroxyphenyl-3-benzoic acid, etc., as well as alkyl, alkoxy, aryl and halogen substituents thereof, and combination thereof. Particularly suitable aromatic hydroxycarboxylic acids may include, for instance, 4-hydroxybenzoic acid ("HBA") and 2-hydroxy-6-naphthoic acid ("HNA").

The polyester may also contain aromatic dicarboxylic acid repeating units of Formula (IV) in an amount from about 1 mol. % to about 40 mol. %, in some embodiments from about 5 mol. % to about 30 mol. %, and in some embodiments, from about 10 mol. % to about 25 mol. %:

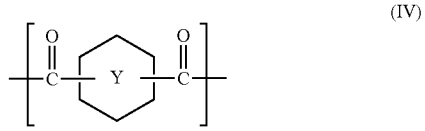

(IV)

wherein, ring Y is aryl (e.g., 1,4-phenylene or 1,3-phenylene).

The aromatic dicarboxylic repeating units of Formula (IV) may be derived from aromatic dicarboxylic acids, such as terephthalic acid, isophthalic acid, 2,6-naphthalenedicarboxylic acid, diphenyl ether-4,4'-dicarboxylic acid, 1,6-naphthalenedicarboxylic acid, 2,7-naphthalenedicarboxylic acid, 4,4'-dicarboxybiphenyl, bis(4-carboxyphenyl)ether, bis(4-carboxyphenyl)butane, bis(4-carboxyphenyl)ethane, bis(3-carboxyphenyl)ether, bis(3-carboxyphenyl)ethane, etc., as well as alkyl, alkoxy, aryl and halogen substituents thereof, and combinations thereof. Particularly suitable aromatic dicarboxylic acids may include, for instance, terephthalic acid ("TA") and isophthalic acid ("IA").

While a wide variety of aromatic ester repeating units may be employed, the polymer may nevertheless be "low naphthenic" to the extent that it contains a minimal content of repeating units derived from naphthenic hydroxycarboxylic acids and naphthenic dicarboxylic acids, such as naphthalene-2,6-dicarboxylic acid ("NDA"), 2-hydroxy-6-naphthoic acid ("HNA"), or combinations thereof. That is, the total amount of repeating units derived from naphthenic hydroxycarboxylic and/or dicarboxylic acids (e.g., NDA, HNA, or a combination of HNA and NDA) is typically no more than about 30 mol. %, in some embodiments no more than about 25 mol. %, in some embodiments no more than about 20 mol. %, in some embodiments no more than about 15 mol. %, and in some embodiments, from 0 mol. % to about 10 mol. % of the polymer (e.g., 0 mol. %). Despite the absence of a high level of conventional naphthenic acid repeating units, the present inventor has discovered that selective control over the type and relative concentration of the biphenyl repeating units can lead to "low naphthenic" polymers that are not only crosslinkable, but also capable of exhibiting good thermal and mechanical properties.

Of course, other repeating units may also be employed in the polymer. In certain embodiments, for instance, repeating units may be employed that are derived from aromatic dials, such as hydroquinone, resorcinol, 2,6-dihydroxynaphthalene, 2,7-dihydroxynaphthalene, 1,6-dihydroxynaphthalene, 4,4'-dihydroxybiphenyl (or 4,4'-biphenol), 3,3'-dihydroxybiphenyl, 3,4'-dihydroxybiphenyl, 4,4'-dihydroxybiphenyl ether, bis(4-hydroxyphenyl)ethane, etc., as well as alkyl, alkoxy, aryl and halogen substituents thereof, and combinations thereof. Particularly suitable aromatic diols may include, for instance, hydroquinone ("HQ") and 4,4'-biphenol ("BP"). When employed, repeating units derived from aromatic dials (e.g., HQ and/or BP) typically constitute from about 1 mol. % to about 30 mol. %, in some embodiments from about 2 mol. % to about 25 mol. %, and in some embodiments, from about 5 mol. % to about 20% of the polymer. Repeating units may also be employed, such as those derived from aromatic amides (e.g., acetaminophen ("APAP")) and/or aromatic amines (e.g., 4-aminophenol ("AP"), 3-aminophenol, 1,4-phenylenediamine, 1,3-phenylenediamine, etc.). When employed, repeating units derived from aromatic amides (e.g., APAP) and/or aromatic amines (e.g., AP) typically constitute from about 0.1 mol. % to about 20 mol. %, in some embodiments from about 0.5 mol. % to about 15 mol. %, and in some embodiments, from about 1 mol. % to about 10% of the polymer. Aromatic monofunctional carboxylic acids (e.g., benzoic acid), phenols, amines, and/or amides (e.g., acetamides) may also be employed in certain embodiments of the present invention. When employed, repeating units derived from such aromatic monofunctional compounds typically constitute from about 0.05 mol. % to about 10 mol. %, in some embodiments from about 0.1 mol. % to about 10 mol. %, and in some embodiments, from about 0.5 mol. % to about 5% of the polymer.

It should also be understood that various other monomeric repeating units may be incorporated into the polymer. For instance, in certain embodiments, the polymer may contain one or more repeating units derived from non-aromatic monomers, such as aliphatic or cycloaliphatic hydroxycarboxylic acids, dicarboxylic acids, diols, amides, amines, etc. Of course, in other embodiments, the polymer may be "wholly aromatic" in that it lacks repeating units derived from non-aromatic (e.g., aliphatic or cycloaliphatic) monomers.

In one particular embodiment, the aromatic polyester may contain repeating units derived from 4-hydroxybenzoic acid ("HBA"), and terephthalic acid ("TA") and/or isophthalic acid ("IA"), as well as various other optional constituents. The repeating units derived from 4-hydroxybenzoic acid ("HBA") may constitute from about 25 mol. % to about 85 mol. %, in some embodiments from about 40 mol. % to about 80 mol. %, and in some embodiments, from about 50 mol. % to about 75% of the polymer. The repeating units derived from terephthalic acid ("TA") and/or isophthalic acid ("IA") may likewise constitute from about 1 mol. % to about 40 mol. %, in some embodiments from about 5 mol. % to about 30 mol. %, and in some embodiments from about 10 mol. % to about 25 mol. % of the polymer. Other possible repeating units may include those derived from 4,4'-biphenol ("BP"), hydroquinone ("HQ"), and/or acetaminophen ("APAP"). In certain embodiments, for example, repeating units derived from BP, HQ, and/or APAP may each constitute from about 1 mol. % to about 30 mol. %, in some embodiments from about 2 mol. % to about 25 mol. %, and in some embodiments, from about 3 mol. % to about 20 mol. % when employed. If desired, the polymer may also contain a relatively low amount of repeating units derived from naphthenic monomers (6-hydroxy-2-naphthoic acid ("HNA") or 2,6-naphthalenedicarboxylic acid ("NDA") within the ranges noted above.

As indicated above, the precursor monomers used to form the crosslinkable polymer are polymerized in the presence of an aromatic alkynyl crosslinking agent. The aromatic alkynyl crosslinking agent of the present invention has the following general formula (I):

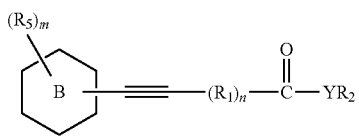

(I)

wherein, ring B is a 6-membered aromatic ring wherein 1 to 3 ring carbon atoms are optionally replaced by nitrogen or oxygen, wherein each nitrogen is optionally oxidized, and wherein ring B may be optionally fused or linked to a 5- or 6-membered aryl, heteroaryl, cycloalkyl, or heterocyclyl;

$R_5$ is alkynyl, alkyl, alkenyl, aryl, heteroaryl, cycloalkyl, heterocyclyl, halo, or haloalkyl;

m is from 0 to 4, and in some embodiments, from 0 to 2 (e.g., 0);

n is from 0 to 6, and in some embodiments, from 0 to 2 (e.g., 0);

Y is O, S, or $NR_3$;

$R_1$ is alkyl or alkenyl;

$R_2$ is hydrogen, alkyl, aryl, heteroaryl, cycloalkyl, or heterocyclyl; and $R_3$ is hydrogen, alkyl, aryl, heteroaryl, cycloalkyl, or heterocyclyl.

The aromatic alkynyl crosslinking agent generally has a relatively low molecular weight so that it does not adversely impact the melt rheology of the polymer. For example, the alkynyl crosslinking agent typically has a molecular weight of about 1,000 grams per mole or less, in some embodiments from about 20 to about 500 grams per mole, in some embodiments from about 30 to about 400 grams per mole, and in some embodiments, from about 50 to about 200 grams per mole. In addition to possessing a relatively low molecular weight, the alkynyl crosslinking agent also generally possesses a high alkynyl functionality so it is capable of undergoing a sufficient degree of thermal crosslinking with the liquid crystalline polymer. The degree of alkynyl functionality for a given molecule may be characterized by its "alkynyl equivalent weight", which reflects the amount of a compound that contains one molecule of an alkynyl functional group and may be calculated by dividing the molecular weight of the compound by the number of alkynyl functional groups in the molecule. For example, the crosslinking agent may contain from 1 to 10, in some embodiments from 1 to 8, and in some embodiments, from 1 to 4 alkynyl functional groups per molecule. The alkynyl equivalent weight may likewise be from about 10 to about 1,000 grams per mole, in some embodiments from about 20 to about 500 grams per mole, in some embodiments from about 30 to about 400 grams per mole, and in some embodiments, from about 50 to about 200 grams per mole. In one embodiment, the alkynyl crosslinking agent is a mono-functional compound in that Ring B is directly bonded to only one alkynyl group. In such embodiments, m in Formula (I) may be 0.

In certain embodiments, Ring B in Formula (I) above may be selected from the following:

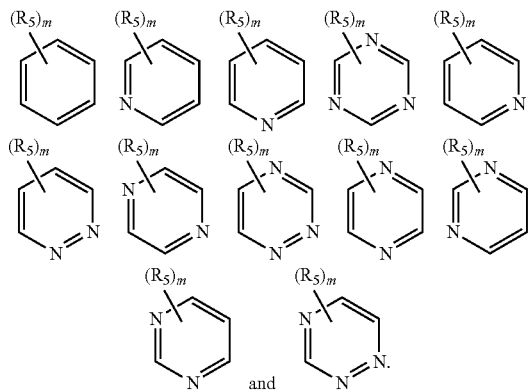

wherein, m is 0, 1, 2, 3, or 4, in some embodiments m is 0, 1, or 2, in some embodiments m is 0 or 1, and in some embodiments, m is 0; and $R_5$ is halo, haloalkyl, alkyl, alkenyl, aryl, heteroaryl, cycloalkyl, or heterocyclyl. For example, m may be 1 or more and $R_5$ may be halo (e.g., fluorine), alkyl, or aryl (e.g., phenyl). In other embodiments, m may be equal to 0 so that the Ring B (e.g., phenyl). In particular embodiments, for example, the aromatic alkynyl crosslinking agent is provided by general formula (II):

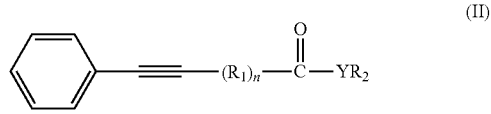

(II)

wherein, n, Y, $R_1$, and $R_2$ are as defined above.

For example, n in Formula (I) and (II) may be equal to 1. In other embodiments, n may be 0. In particular embodiments, Y may be O or NH, $R_2$ may be H or alkyl. For example, $YR_2$ may be OH, $NH_2$, O-alkyl, NH-alkyl, etc. Specific embodiments of the aromatic alkynyl crosslinking agent may include, for instance, 3-phenylprop-2-ynoic acid or phenyl propiolic acid (Ring B is phenyl, m and n are 0, Y is O, and $R_2$ is H); methyl-3-phenylprop-2-ynoate (Ring B is phenyl, m and n are 0, Y is O, and $R_2$ is $CH_3$); 3-phenylprop-2-ynamide (Ring B is phenyl, m and n are 0, Y is $NR_3$, $R_2$ is H, and $R_3$ is H); methanamine (Ring B is phenyl, m and n are 0, Y is $NR_3$, $R_2$ is H, and $R_3$ is $CH_3$); 4-phenylbut-3-ynoic acid (Ring B is phenyl, m is 0, n is 1; $R_1$ is $CH_2$, Y is O, and $R_2$ is H); 5-phenylpent-2-en-4-ynoic acid (Ring B is phenyl, m is 0, n is 1; $R_1$ is HC=CH, Y is O, and $R_2$ is H); and so forth. Phenyl propiolic acid, which has the structure set forth below, is particularly suitable for use in the present invention.

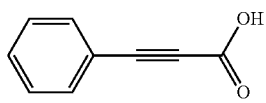

The crosslinkable liquid crystalline polymer may generally be prepared by introducing the precursor monomers used to form the backbone of the polymer (e.g., aromatic hydroxycarboxylic acid, aromatic dicarboxylic acid, aromatic diol, aromatic amide, aromatic amine, etc.) into a reactor vessel to initiate a polycondensation reaction. The particular conditions and steps employed in such reactions may be described in more detail in U.S. Pat. No. 4,161,470 to Calundann; U.S. Pat. No. 5,616,680 to Linstid, III, et al.; U.S. Pat. No. 6,114,492 to Linstid, III, et al.; U.S. Pat. No. 6,514,611 to Shepherd, et al.; and WO 2004/058851 to Waggoner. The vessel employed for the reaction is not especially limited, although it is typically desired to employ one that is commonly used in reactions of high viscosity fluids. Examples of such a reaction vessel may include a stirring tank-type apparatus that has an agitator with a variably-shaped stirring blade, such as an anchor type, multistage type, spiral-ribbon type, screw shaft type, etc., or a modified shape thereof. Further examples of such a reaction vessel may include a mixing apparatus commonly used in resin kneading, such as a kneader, a roll mill, a Banbury mixer, etc.

If desired, the polymerization reaction may proceed through the acetylation of the monomers as known in art. Acetylation may occur in a separate reactor vessel, or it may occur in situ within the polymerization reactor vessel. When separate reactor vessels are employed, one or more of the monomers may be introduced to the acetylation reactor and subsequently transferred to the melt polymerization reactor. Likewise, one or more of the monomers may also be directly introduced to the reactor vessel without undergoing pre-acetylation. Acetylation may be accomplished by adding an acetylating agent (e.g., acetic anhydride) to one or more of the monomers. One particularly suitable technique for acetylating monomers may include, for instance, charging precursor monomers (e.g., 4-hydroxybenzoic acid and 2,6-hydroxynaphthoic acid) and acetic anhydride into a reactor and heating the mixture to acetylize a hydroxyl group of the monomers (e.g., forming acetoxy).

Acetylation is generally initiated at temperatures of about 90° C. During the initial stage of the acetylation, reflux may be employed to maintain vapor phase temperature below the point at which acetic acid byproduct and anhydride begin to distill. Temperatures during acetylation typically range from between 90° C. to 150° C., and in some embodiments, from about 110° C. to about 150° C. If reflux is used, the vapor phase temperature typically exceeds the boiling point of acetic acid, but remains low enough to retain residual acetic anhydride. For example, acetic anhydride vaporizes at temperatures of about 140° C. Thus, providing the reactor with a vapor phase reflux at a temperature of from about 110° C. to about 130° C. is particularly desirable. To ensure substantially complete reaction, an excess amount of acetic anhydride may be employed. The amount of excess anhydride will vary depending upon the particular acetylation conditions employed, including the presence or absence of reflux. The use of an excess of from about 1 to about 10 mole percent of acetic anhydride, based on the total moles of reactant hydroxyl groups present is not uncommon.

After any optional acetylation is complete, the resulting composition may be melt-polymerized. Although not required, this is typically accomplished by transferring the acetylated monomer(s) to a separator reactor vessel for conducting a polycondensation reaction. If desired, one or more of the precursor monomers used to form the liquid crystalline polymer may be directly introduced to the melt polymerization reactor vessel without undergoing pre-acetylation. Other components may also be included within the reaction mixture to help facilitate polymerization. For instance, a catalyst may be optionally employed, such as metal salt catalysts (e.g., magnesium acetate, tin(I) acetate, tetrabutyl titanate, lead acetate, sodium acetate, potassium acetate, etc.) and organic compound catalysts (e.g., N-methylimidazole). Such catalysts are typically used in amounts of from about 50 to about 500 parts per million based on the total weight of the recurring unit precursors. The catalyst is typically added to the acetylation reactor rather than the polymerization reactor, although this is by no means a requirement.

In some embodiments, the melt polymerized polymer may also be subjected to a subsequent solid-state polymerization method to further increase its molecular weight. For instance, solid-state polymerization may be conducted in the presence of a gas (e.g., air, inert gas, etc.). Suitable inert gases may include, for instance, include nitrogen, helium, argon, neon, krypton, xenon, etc., as well as combinations thereof. The solid-state polymerization reactor vessel can be of virtually any design that will allow the polymer to be maintained at the desired solid-state polymerization temperature for the desired residence time. Examples of such vessels can be those that have a fixed bed, static bed, moving bed, fluidized bed, etc. The temperature at which solid-state polymerization is performed may vary, but is typically within a range of from about 250° C. to about 300° C. The polymerization time will of course vary based on the temperature and target molecular weight. In most cases, however, the solid-state polymerization time will be from about 2 to about 12 hours, and in some embodiments, from about 4 to about 10 hours.

Regardless of the particular method employed, the aromatic alkynyl crosslinking agent may be supplied at any stage of the polymerization process, such as to the acetylation reactor vessel, melt polymerization reactor vessel, solid state polymerization reactor vessel, etc., as well as combinations of the foregoing. Although it may be introduced at any stage, it is typically desired to supply the alkynyl crosslinking agent before and/or during melt polymerization so that it forms a reaction mixture with the precursor monomers. The relative amount of the aromatic alkynyl crosslinking agent in the reaction mixture may be from about 0.1 to about 10 parts, in some embodiments from about 0.5 to about 8 parts, and in some embodiments, from about 1 to about 5 parts by weight relative to 100 parts by weight of the reaction mixture. Aromatic alkynyl crosslinking agents may, for example, constitute from about 0.1 wt. % to about 10 wt. %, in some embodiments from about 0.5 wt. % to about 8 wt. %, and in some embodiments, from about 1 wt. % to about 5 wt. % of the reaction mixture. Precursor monomers may likewise constitute from about 90 wt. % to about 99.9 wt. %, in some embodiments from about 92 wt. % to about 99.5 wt. %, and in some embodiments, from about 95 wt % to about 99 wt. % of the reaction mixture. For example, aromatic hydroxycarboxylic acid precursor monomers (e.g., acetylated or non-acetylated HBA, acetylated or non-acetylated HNA, etc.) may constitute from about 25 wt. % to about 85 wt. %, in some embodiments from about 40 wt % to about 80 wt. %, and in some embodiments, from about 50 wt. % to about 75 wt. % of the reaction mixture. Aromatic dicarboxylic acid precursor monomers (e.g., TA, IA, etc.) may also constitute from about 1 wt. % to about 40 wt. %, in some embodiments from about 5 wt. % to about 30 wt. %, and in some embodiments, from about 10 wt. % to about 25 wt % of the reaction mixture. While referred to in terms of the reaction mixture, it should also be understood that the ratios and weight percentages may also be applicable to the final polymer. That is, the parts by weight of the alkynyl crosslinking agent relative to 100 parts by weight of the crosslinkable liquid crystalline polymer and the percentage of the alkynyl crosslinking agents in the final polymer may be within the ranges noted above.

The particular conditions and steps employed during the melt-polymerization reaction may be selectively controlled to achieve the desired degree of polymerization without inducing thermal crosslinking. This may be accomplished, for example, by melt polymerizing the reaction mixture at a temperature of from about 280° C. to about 350° C., in some embodiments from about 290° C. to about 335° C., and in some embodiments, from about 300° C. to about 330° C. If desired, the polymer may thereafter be subjected to solid-state polymerization, such as described above, to further increase its molecular weight.

One particularly suitable technique for forming the crosslinkable liquid crystalline polymer includes charging precursor monomers (e.g., aromatic hydroxycarboxylic acid, aromatic dicarboxylic acid, aromatic diol, aromatic amide, aromatic amine, etc.), aromatic alkynyl crosslinking agent, and an acetylating agent (e.g., acetic anhydride) into a reactor, heating the mixture to a temperature (e.g., from about 90° C. to about 150° C.) to acetylize a hydroxyl group of the monomers (e.g., forming acetoxy), and then heating the mixture to an elevated temperature of from about 280° C. to about 350° C. to carry out melt polycondensation. As the final polymerization temperatures are approached, volatile byproducts of the reaction (e.g., acetic acid) may also be removed so that the desired molecular weight may be readily achieved. The reaction mixture is generally subjected to agitation during polymerization to ensure good heat and mass transfer, and in turn, good material homogeneity. The rotational velocity of the agitator may vary during the course of the reaction, but typically ranges from about 10 to about 100 revolutions per minute ("rpm"), and in some embodiments, from about 20 to about 80 rpm. To build molecular weight in the melt, the polymerization reaction may also be conducted under vacuum, the application of which facilitates the removal of volatiles formed during the final stages of polycondensation. The vacuum may be created by the application of a suctional pressure, such as within the range of from about 5 to about 30 pounds per square inch ("psi"), and in some embodiments, from about 10 to about 20 psi. Following melt polymerization, the molten polymer may be discharged from the reactor, typically through an extrusion orifice fitted with a die of desired configuration, cooled, and collected. Commonly, the melt is discharged through a perforated die to form strands that are taken up in a water bath, pelletized and dried.

Although not necessarily a requirement, the resulting crosslinkable polymer is generally classified as a "thermotropic liquid crystalline" polymer to the extent that it can possess a rod-like structure and exhibit a liquid crystalline behavior in its molten state (e.g., thermotropic nematic state). The polymer may possess a fully crystalline, semi-crystalline, or amorphous-like structure under certain circumstances. The intrinsic viscosity of the polymer, which is generally proportional to molecular weight, may be relatively high. For example, the intrinsic viscosity may be about 2 deciliters per gram ("dL/g") or more, in some embodiments about 3 dL/g or more, in some embodiments from about 5 to about 20 dL/g, and in some embodiments from about 6 to about 15 dL/g. Intrinsic viscosity may be determined in accordance with ISO-1628-5 using a 50/50 (v/v) mixture of pentafluorophenol and hexafluoroisopropanol, as described in more detail below. The crystallization temperature may likewise range from about 250° C. to about 330° C., in some embodiments from about 260° C. to about 320° C., and in some embodiments, from about 280° C. to about 310° C.

Once the crosslinkable polymer is formed, it may be thermally crosslinked when desired. Thermal crosslinking typically occurs at temperatures of about 380° C. or more, in some embodiments about 390° C. or more, and in some embodiments, 400° C. to about 450° C. Although not always the case, a small portion of the alkynyl crosslinking agent may also remain unreacted and within the polymer composition after crosslinking. For example, in certain embodiments, the crosslinking agent may constitute from about 0.001 wt. % to about 2 wt. %, and in some embodiments, from about 0.01 wt. % to about 1 wt. %, and in some embodiments, from about 0.05 wt. % to about 0.5 wt. % of the polymer composition.

If desired, a neat liquid crystalline polymer may be thermally crosslinked, or the polymer may first be blended with one or more additives to form a polymer composition, which is then subjected to thermal crosslinking. Examples of suitable additives may include, for instance, antimicrobials, pigments, antioxidants, stabilizers, surfactants, waxes, flow promoters, solid solvents, fillers, and other materials added to enhance properties and processibility. For example, a filler material may be incorporated with the polymer composition to enhance strength. A filler composition can include a filler material such as a fibrous filler and/or a mineral filler and optionally one or more additional additives as are generally known in the art. Mineral fillers may, for instance, be employed in the polymer composition to help achieve the desired mechanical properties and/or appearance. When employed, mineral fillers typically constitute from about 5 wt. % to about 60 wt. %, in some embodiments from about 10 wt. % to about 55 wt. %, and in some embodiments, from about 20 wt. % to about 50 wt. % of the polymer composition. Clay minerals may be particularly suitable for use in the present invention. Examples of such clay minerals include, for instance, talc ($Mg_3Si_4O_{10}(OH)_2$), halloysite ($Al_2Si_2O_5(OH)_4$), kaolinite ($Al_2Si_2O_5(OH)_4$), illite (($K,H_3O)(Al,Mg,Fe)_2(Si,Al)_4O_{10}[(OH)_2,(H_2O)]$), montmorillonite ($(Na,Ca)_{0.33}(Al,Mg)_2Si_4O_{10}(OH)_2 \cdot nH_2O$), vermiculite ($(MgFe,Al)_3(Al,Si)_4O_{10}(OH)_2 \cdot 4H_2O$), palygorskite (($(Mg,Al)_2Si_4O_{10}(OH) \cdot 4(H_2O)$)), pyrophyllite ($Al_2Si_4O_{10}(OH)_2$), etc., as well as combinations thereof. In lieu of, or in addition to, clay minerals, still other mineral fillers may also be employed. For example, other suitable fillers may include calcium silicate, aluminum silicate, mica, diatomaceous earth, wollastonite, alumina, silica, titanium dioxide, calcium carbonate, and so forth. Mica, for instance, may be particularly suitable. There are several chemically distinct mica species with considerable variance in geologic occurrence, but all have essentially the same crystal structure. As used herein, the term "mica" is meant to generically include any of these species, such as muscovite ($KAl_2(AlSi_3)O_{10}(OH)_2$), biotite ($K(Mg,Fe)_3(AlSi_3)O_{10}(OH)_2$), phlogopite ($KMg_3(AlSi_3)O_{10}(OH)_2$), lepidolite ($K(Li,Al)_{2-3}(AlSi_3)O_{10}(OH)_2$), glauconite ($(K,Na)(Al,Mg,Fe)_2(Si,Al)_4O_{10}(OH)_2$), etc., as well as combinations thereof.

Fibers may also be employed as a filler material to further improve the mechanical properties. Such fibers generally have a high degree of tensile strength relative to their mass. For example, the ultimate tensile strength of the fibers (determined in accordance with ASTM D2101) is typically from about 1,000 to about 15,000 Megapascals ("MPa"), in some embodiments from about 2,000 MPa to about 10,000 MPa, and in some embodiments, from about 3,000 MPa to about 6,000 MPa. To help maintain an insulating property, which is often desirable for use in electronic components, the high strength fibers may be formed from materials that are also generally insulating in nature, such as glass, ceramics (e.g., alumina or silica), aramids (e.g., Kevlar® marketed by E. I. du Pont de Nemours, Wilmington, Del.), polyolefins, polyesters, etc., as well as mixtures thereof. Glass fibers are particularly suitable, such as E-glass, A-glass, C-glass, D-glass, AR-glass, R-glass, S1-glass, S2-glass, etc., and mixtures thereof. When employed, fibrous fillers typically constitute from about 5 wt. % to about 60 wt. %, in some embodiments from about 10 wt. % to about 55 wt. %, and in some embodiments, from about 20 wt. % to about 50 wt. % of the polymer composition.

The materials used to form the polymer composition may be combined together using any of a variety of different techniques as is known in the art. In one particular embodiment, for example, the polymer and other optional additives are melt processed as a mixture within an extruder to form the polymer composition. The mixture may be melt-kneaded in a single-screw or multi-screw extruder at a temperature of from about 280° C. to about 350° C. In one embodiment, the mixture may be melt processed in an extruder that includes multiple temperature zones. The temperature of individual zones is typically set within about −60° C. to about 25° C. relative to the melting temperature of the polymer. By way of example, the mixture may be melt processed using a twin screw extruder such as a Leistritz 18-mm co-rotating fully intermeshing twin screw extruder. A general purpose screw design can be used to melt process the mixture. In one embodiment, the mixture including all of the components may be fed to the feed throat in the first barrel by means of a volumetric feeder. In another embodiment, different components may be added at different addition points in the extruder, as is known. For example, the polymer may be applied at the feed throat and optional additives may be supplied at the same or different temperature zone located downstream therefrom. Regardless, the resulting mixture can be melted and mixed then extruded through a die. The extruded polymer composition can then be quenched in a water bath to solidify and granulated in a pelletizer followed by drying.

The crosslinkable liquid crystalline polymer of the present invention may generally be employed in a wide variety of possible applications and processes. For example, the polymer is amenable to shape forming and blending techniques, such as film extrusion, fiber spinning, compression molding, injection molding, resin transfer molding, resin film injection, powder molding, pultrusion, blow molding, coating, thermoforming, etc. In certain embodiments, for example, the polymer may be coated onto a substrate. The material and size of the substrate to which the polymer is applied may generally vary depending on the intended application. For example, the substrate may be formed from a metal (e.g., copper), plastic, ceramic, etc. Likewise, in certain embodiments, the substrate may have a foil-like structure in that it is relatively thin, such as having a thickness of about 500 micrometers or less, in some embodiments about 200 micrometers or less, and in some embodiments, from about 1 to about 100 micrometers. Of course, higher thicknesses may also be employed. In some cases, the polymer may be crosslinked before being applied to the substrate. Alternatively, the polymer may be applied to the substrate and thereafter crosslinked to form a thermoset polymer.

The liquid crystalline polymer may also be formed into a variety of other types of articles. For example, the polymer may be employed in a composite that is coated or impregnated with a fibrous material, such as woven fabric, non-woven fabric, fibers, such as glass, silica glass, carbon, alumina, silicon carbide, polyamide, polyimide, polyester fibers, etc. If desired, the crosslinkable polymer may initially be impregnated with the fibers and thereafter heated to an elevated temperature to form a thermally crosslinked polymer matrix. In certain embodiments, such composites may be employed as a supporting material in a flexible printed circuit board. If desired, a conductive layer (e.g., copper foil) may also be laminated to the composite.

The present invention may be better understood with reference to the following examples.

Test Methods

Melt Viscosity:

The melt viscosity (Pa-s) may be determined in accordance with ISO Test No. 11443 at temperatures between 300° C. to 360° C. (e.g., 300° C. or 360° C.) and at a shear rate of 400 $s^{-1}$ and 1000 $s^{-1}$ using a Dynisco 7001 capillary rheometer. The rheometer orifice (die) may have a diameter of 1 mm, length of 20 mm, L/D ratio of 20.1, and an entrance angle of 180°. The diameter of the barrel was 9.55 mm±0.005 mm and the length of the rod may be 233.4 mm.

Complex Viscosity:

The complex viscosity is used herein as an estimate for the degree of crosslinking of the polymer. Complex viscosity is a frequency-dependent viscosity, and may be determined during forced harmonic oscillation of shear stress at angular frequencies of 0.1 radians per second. Measurements may be determined at a constant temperature of 350° C., 380° C., or 400° C. and at a constant strain amplitude of 1% using an ARES-G2 rheometer (TA Instruments) with a parallel plate configuration (25 mm plate diameter).

Intrinsic Viscosity:

The intrinsic viscosity ("IV") may be measured in accordance with ISO-1628-5 using a 50/50 (v/v) mixture of pentafluorophenol and hexafluoroisopropanol. Each sample was prepared in duplicate by weighing about 0.02 grams into a 22 mL vial. 10 mL of pentafluorophenol ("PFP") was added to each vial and the solvent. The vials may be placed in a heating block set to 80° C. overnight. The following day 10 mL of hexafluoroisopropanol ("HFIP") may be added to each vial. The final polymer concentration of each sample may be about 0.1%. The samples may be allowed to cool to room temperature and analyzed using a PolyVisc automatic viscometer.

Melting and Crystallization Temperatures:

The melting temperature ("Tm") and crystallization temperature ("Tc") may be determined by differential scanning calorimetry ("DSC") as is known in the art. The melting temperature is the differential scanning calorimetry (DSC) peak melt temperature as determined by ISO Test No. 11357. The crystallization temperature is determined from the cooling exotherm in the cooling cycle. Under the DSC procedure, samples may be heated and cooled at 20° C. per minute as stated in ISO Standard 10350 using DSC measurements conducted on a TA Q2000 Instrument.

EXAMPLE 1

A 2 L flask was charged with 4-hydroxybenzoic acid (415.7 g), 2,6-hydroxynaphthoic acid (32 g), terephthalic acid (151.5), 4,4'-biphenol (122.9 g), acetaminophen (37.8 g), potassium acetate (50 mg), and phenyl propiolic acid (21.92 g). The flask next was equipped with C-shaped stirrer, a thermal couple, a gas inlet, and distillation head. The flask was placed under a low nitrogen purge and acetic anhydride (99.7% assay, 497.6 g) was added. The milky-white slurry was agitated at 75 rpm and heated to 140° C. over the course of 95 minutes using a fluidized sand bath. After this time, the mixture was then gradually heated to 360° C. steadily over 300 minutes. Reflux was seen once the reaction exceeded 140° C. and the overhead temperature increased to approximately 115° C. as acetic acid byproduct was removed from the system. During the heating, the mixture became yellow and slightly more viscous and the vapor temperature gradually dropped to 90° C. Once the mixture had reached 360° C., the nitrogen flow was stopped. The flask was evacuated below 20 psi and the agitation slowed to 30 rpm over the course of 45 minutes. After 29 minutes, in the final vacuum step, the final viscosity target was reached as gauged by the strain on the agitator motor (no torque). The reaction was stopped by releasing the vacuum and stopping the heat flow to the reactor. The flask was then cooled and the polymer was recovered as a solid, dense yellow-brown plug. Sample for analytical testing was obtained by mechanical size reduction.

EXAMPLE 2

A 2 L flask may be charged with 4-hydroxybenzoic acid (415.7 g), 2,6-hydroxynaphthoic acid (32 g), terephthalic acid (151.5), 4,4'-biphenol (122.9 g), acetaminophen (37.8 g), potassium acetate (50 mg), and phenyl propiolic acid (7.3 g). The polymer may then be polymerized as described above in Example 1.

The samples of the aforementioned examples are then tested for thermal properties. The results are set forth below.

|  | Ex. 1 | Ex. 2 |
|---|---|---|
| Wt. % of Phenyl Propiolic Acid | 2.8 | 1.0 |
| Melt Viscosity (1000 s$^{-1}$) (Pa-s) | 7.2 | 84.3 |
| Melt Viscosity (400 s$^{-1}$) (Pa-s) | 3.8 | 123.4 |
| Intrinsic Visc. (dL/g) | 3.3 | 8.6 |
| Tm (° C.) | 338 | 360 |
| Tc (° C.) | 293.02 | 303.4 |

Figure 2:
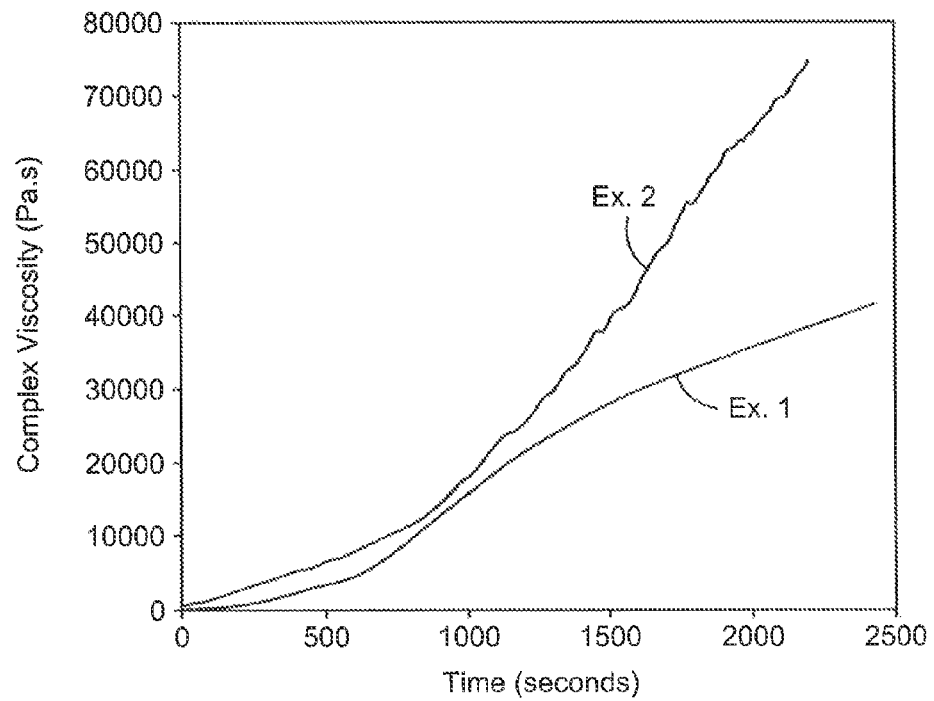
FIG. 2 is a graph showing the complex viscosity at 400° C. due to thermal crosslinking.
Figure 3:
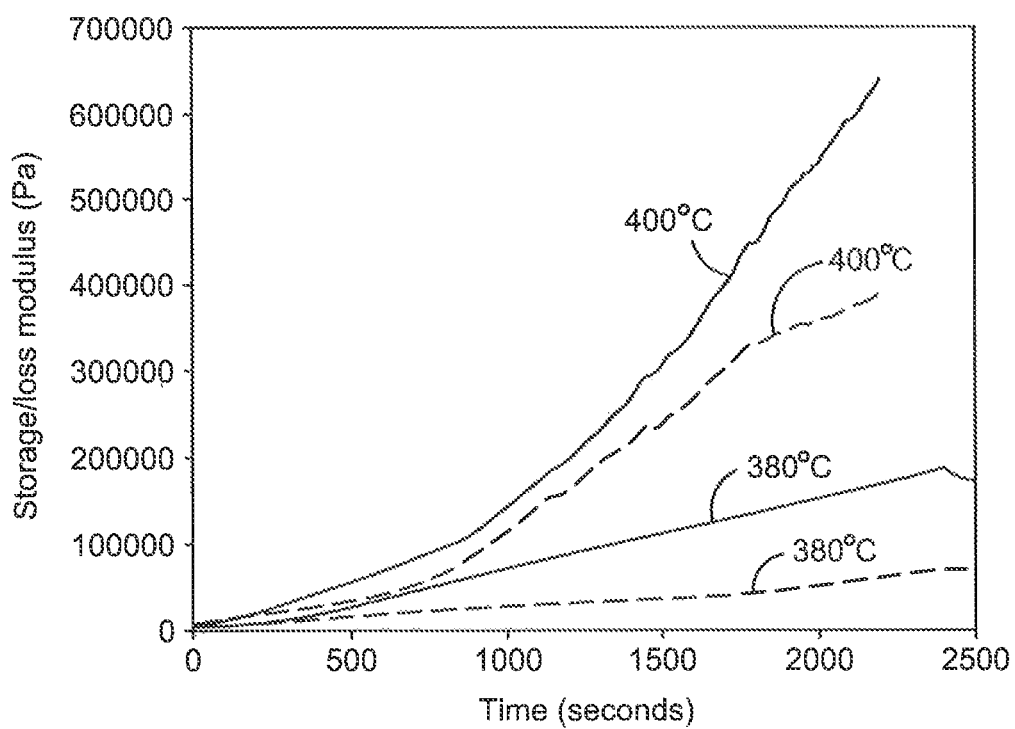
FIG. 3 is a graph showing the storage and loss modulii for Example 2 at 380° C. and 400° C. due to thermal crosslinking, where the solid lines represent the storage modulus and the broken lines represent the loss modulus.

The resulting polymers are also analyzed for thermal crosslinking at various temperatures. The results are shown in FIGS. 1-2. As indicated, Example 2 resulted in a higher moduli after crosslinking at elevated temperatures in comparison to Example 1, which is likely due to the higher polymer melt viscosity (before curing). FIG. 3 also illustrates that the temperature of curing affects the resultant modulus. The moduli are substantially higher when thermal crosslinking is conducted at 400° C. rather than 380° C.

EXAMPLE 3

The melt polymerized polymer of Example 2 is solid-state polymerized by heating 100 grams of the polymer in an air circulated oven for eight (8) hours. The oven is maintained at 280° C. The polymer flakes is placed uniformly in a thin layer within a glass tray. The polymers are tested for lap shear strength (as an estimation of their adhesion properties). The results are provided below.

| Example | Lap Shear Strength (MPa) |
|---|---|
| 2 | 0.83 |
| 3 | 1.20 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A crosslinkable liquid crystalline polymer formed by polymerizing a precursor monomer in the presence of an aromatic alkynyl crosslinking agent having the following general formula (I):

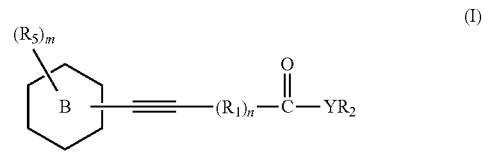

wherein,
ring B is a 6-membered aromatic ring wherein 1 to 3 ring carbon atoms are optionally replaced by nitrogen or oxygen, wherein each nitrogen is optionally oxidized, and wherein ring B may be optionally fused or linked to a 5- or 6-membered aryl, heteroaryl, cycloalkyl, or heterocyclyl;
$R_5$ is alkynyl, alkyl, alkenyl, aryl, heteroaryl, cycloalkyl, heterocyclyl, halo, or haloalkyl;
m is from 0 to 4;
n is from 0 to 6;
Y is O, S, or $NR_3$;
$R_1$ is alkyl or alkenyl;
$R_2$ is hydrogen, alkyl, aryl, heteroaryl, cycloalkyl, or heterocyclyl; and
$R_3$ is hydrogen, alkyl, aryl, heteroaryl, cycloalkyl, or heterocyclyl.

2. The crosslinkable liquid crystalline polymer of claim 1, wherein m is equal to 0.

3. The crosslinkable liquid crystalline polymer of claim 1, wherein the aromatic alkynyl crosslinking agent has the general formula (II):

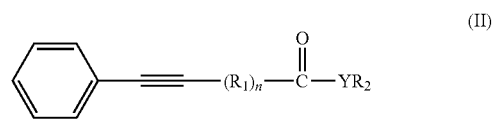

wherein, n, Y, $R_1$, and $R_2$ are as defined above.

4. The crosslinkable liquid crystalline polymer of claim 1, wherein n is 0.

5. The crosslinkable liquid crystalline polymer of claim 1, wherein Y is O or NH, and $R_2$ is H or alkyl.

6. The crosslinkable liquid crystalline polymer of claim 5, wherein $YR_2$ is OH, $NH_2$, O-alkyl, or NH-alkyl.

7. The crosslinkable liquid crystalline polymer of claim 5, wherein $YR_2$ is OH.

8. The crosslinkable liquid crystalline polymer of claim 1, wherein the aromatic alkynyl crosslinking agent is phenyl propiolic acid, methyl-3-phenylprop-2-ynoate, 3-phenylprop-2-ynamide, methanamine, 4-phenylbut-3-ynoic acid, or 5-phenylpent-2-en-4-ynoic acid.

9. The crosslinkable liquid crystalline polymer of claim 1, wherein the aromatic alkynyl crosslinking agent is phenyl propiolic acid.

10. The crosslinkable liquid crystalline polymer of claim 1, wherein the polymer contains from about 25 mol. % to about 85 mol. % of aromatic hydroxycarboxylic repeating units of Formula III:

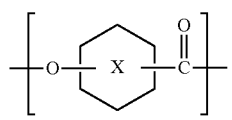

(III)

and from about 1 mol. % to about 40 mol. % of aromatic dicarboxylic acid repeating units of Formula IV:

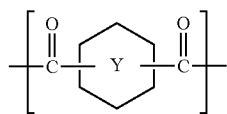

(IV)

wherein, ring X and Y are independently aryl.

11. The crosslinkable liquid crystalline polymer of claim 10, wherein ring X and ring Y are 1,4-phenylene.

12. The crosslinkable liquid crystalline polymer of claim 10, wherein the aromatic dicarboxylic acid repeating units include units derived from terephthalic acid, isophthalic acid, or a combination thereof.

13. The crosslinkable liquid crystalline polymer of claim 10, wherein the aromatic hydroxycarboxylic acid repeating units include units derived from 4-hydroxybenzoic acid.

14. The crosslinkable liquid crystalline polymer of claim 10, wherein the polymer further comprises one or more repeating units derived from an aromatic diol, aromatic amide, aromatic amine, or a combination thereof.

15. The crosslinkable liquid crystalline polymer of claim 1, wherein the polymer is wholly aromatic.

16. The crosslinkable liquid crystalline polymer of claim 1, wherein the total amount of repeating units in the polymer derived from naphthenic hydroxycarboxylic acids and/or naphthenic dicarboxylic acids is from 0% to about 10 mol. %.

17. The crosslinkable liquid crystalline polymer of claim 1, wherein the crosslinkable liquid crystalline polymer has a melting temperature of from about 280° C. to about 350° C.

18. The crosslinkable liquid crystalline polymer of claim 1, wherein the polymer has a melt viscosity of about 150 Pa-s or less, determined at a shear rate of 1000 seconds$^{-1}$ and a temperature of 300° C.

19. A thermoset polymer formed by thermally crosslinking the liquid crystalline polymer of claim 1.

20. A method for forming a liquid crystalline polymer, the method comprising melt polymerizing a reaction mixture comprising a precursor monomer and an aromatic alkynyl crosslinking agent having the following general formula (I):

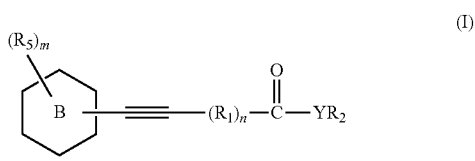

(I)

wherein,
ring B is a 6-membered aromatic ring wherein 1 to 3 ring carbon atoms are optionally replaced by nitrogen or oxygen, wherein each nitrogen is optionally oxidized, and wherein ring B may be optionally fused or linked to a 5- or 6-membered aryl, heteroaryl, cycloalkyl, or heterocyclyl;

$R_5$ is alkynyl, alkyl, alkenyl, aryl, heteroaryl, cycloalkyl, heterocyclyl, halo, or haloalkyl;

m is from 0 to 4;

n is from 0 to 6;

Y is O, S, or $NR_3$;

$R_1$ is alkyl or alkenyl;

$R_2$ is hydrogen, alkyl, aryl, heteroaryl, cycloalkyl, or heterocyclyl; and $R_3$ is hydrogen, alkyl, aryl, heteroaryl, cycloalkyl, or heterocyclyl.

21. The method of claim 20, wherein the melting temperature of the polymer is from about 280° C. to about 350° C.

22. The method of claim 20, wherein aromatic alkynyl crosslinking agents constitute from about 0.1 wt. % to about 10 wt. % of the reaction mixture.

23. The method of claim 20, wherein aromatic hydroxycarboxylic acid precursor monomers constitute from about 25 wt. % to about 85 wt. % of the reaction mixture and wherein aromatic dicarboxylic acid precursor monomers constitute from about 1 wt. % to about 40 wt. % of the reaction mixture.

24. The method of claim 20, wherein the reaction mixture is melt polymerized at a temperature of from about 280° C. to about 350° C.

25. The method of claim 20, further comprising solid-state polymerizing the melt polymerized reaction mixture.

26. The method of claim 20, wherein the precursor monomer is acetylated.

27. The method of claim 20, further comprising thermally crosslinking the melt polymerized reaction mixture.

28. The method of claim 27, wherein the thermal crosslinking is conducted at a temperature of about 380° C. or more.

* * * * *